Jan. 30, 1968     R. W. BLATT ET AL     3,366,770

ELECTROEROSIVE APPARATUS

Filed Dec. 16, 1963

INVENTORS
Rudolph W. Blatt,
Ralph W. Behler, &
Winlaw B. Bramley, Jr.

Hugh L. Fisher
ATTORNEY

United States Patent Office 3,366,770
Patented Jan. 30, 1968

3,366,770
ELECTROEROSIVE APPARATUS
Rudolph W. Blatt, Warren, Ralph W. Behler, Pontiac, and Winlaw B. Bramley, Jr., Milford, Mich., assignors to General Motors Corporation, Detroit, Mich., a corporation of Delaware
Filed Dec. 16, 1963, Ser. No. 331,014
8 Claims. (Cl. 219—69)

ABSTRACT OF THE DISCLOSURE

Electrical stock removal apparatus incorporating a cutting tool that is moved in both gap closing and gap opening directions relative to a workpiece, which is to be machined when power is applied across the gap. The feed motor has a universal joint connection to the cutting tool and four guide motors provide aligning guide movements of the cutting tool relative to the workpiece while resisting the feeding movements with a constant force.

---

This invention relates to improvements in electrical stock removal apparatus.

In the electrical stock removal processes, commonly known as electrical discharge machining and electrochemical machining, efficiency is more a concern than usual, i.e. there must be come reasonable relationship between the electrical power required to operate the apparatus and the amount of stock removed by this power. Obviously, this relationship determines in many instances the extent that the processes can be used commercially. Exemplary of this is the electrical discharge machining process where the input frequency of the power is always substantially greater than the frequency of the discharges actually occurring across the gap. In fact very often the discharge frequency is only one-half of the input frequency. Ideally, of course, the discharge frequency should equal the input frequency; however, for many varied reasons this is never attained because from time to time shorts develop that interfere with the cutting. Some of the reasons for this are the lack of dimensional control of the apparatus' components, fluctuations in the machining fluid pressure, and lack of rapid enough response of the gap spacing control system.

To overcome these problems, novel electrical stock removal apparatus is proposed that overcomes dimensional control problems and offers quick response to control signals, that facilitates stability and that is less susceptible to external error producing forces. More specifically, the invention contemplates apparatus that incorporates novel provisions for enhancing stability. These provisions include a universal connection between a feed motor and an electrode to be maneuvered by the feed motor and a guide motor arrangement that utilizes fluid pressure for exerting a constant force in opposition to the feed motor's movement of the one electrode in a certain direction.

Figure 1:
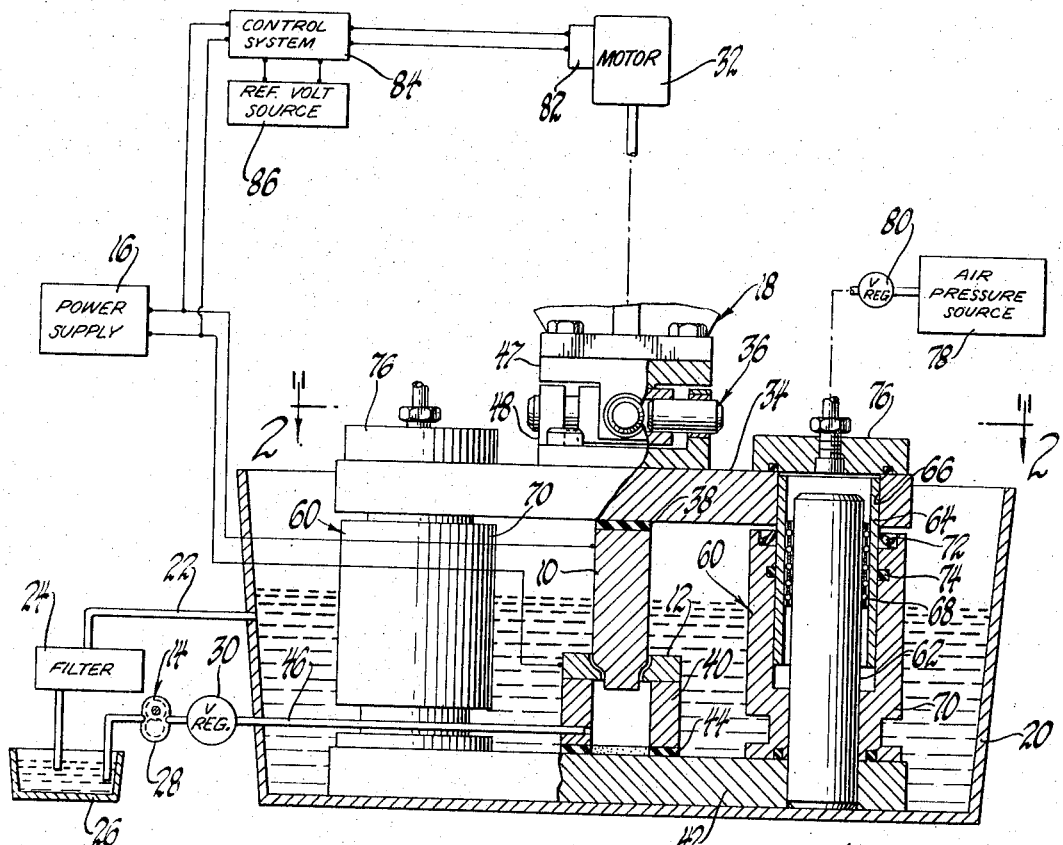
Figure 2:
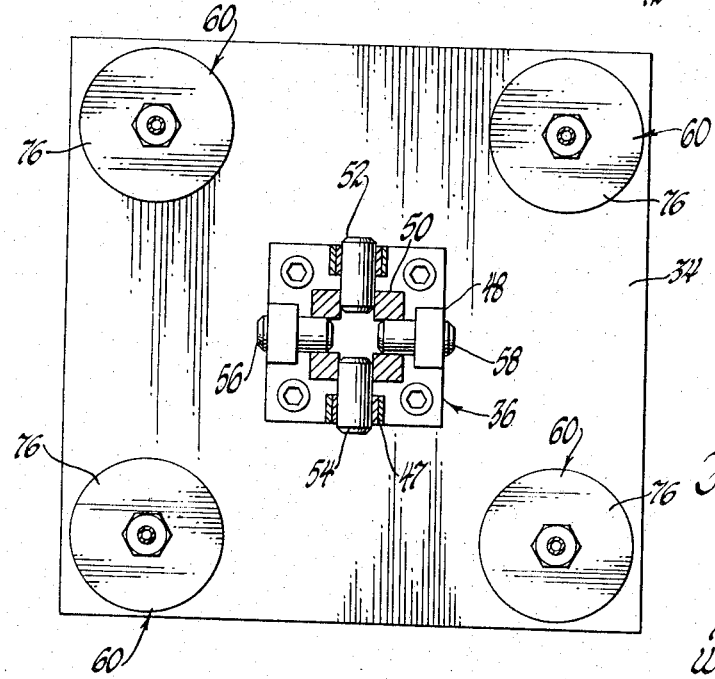

The foregoing and other objects and advantages of the invention will be apparent from the following description and from the accompanying drawings, in which:

FIGURE 1 is both a sectional and diagrammatic view of electrical stock removal apparatus incorporating the principles of the invention; and FIGURE 2 is a view partly in section of the apparatus taken along line 2—2 of FIGURE 1.

Referring now to the drawings in detail, the numerals 10 and 12 denote conductive electrodes that hereinafter will be designated respectively as the cutting tool and the workpiece. The cutting tool 10 and the workpiece 12 have a certain gap formed therebetween to which is supplied a machining fluid from a source denoted generally at 14. Connected across this gap is a power supply 16, the function of which is to supply electrical power thereto. The relative movement between the cutting tool 10 and the workpiece 12 is accomplished by a maneuvering arrangement denoted generally at 18. With the depicted apparatus an electrical discharge occurs between the cutting tool 10 and the workpiece 12, causing stock to be removed from the workpiece 12 according to a scheme that is determined by the configuration of the cutting tool 10.

It should be kept in mind that either the process known as electrical discharge machining or that known as electrochemical machining can be carried out with the FIGURE 1 apparatus. With the electrical discharge machining process, the machining fluid is a dielectric and the power supply 16 is one that supplies a pulsating voltage to the gap. This pulsating voltage, in turn, produces gap breakdowns and, accordingly, intermittent discharges that, in effect, erode stock from the workpiece 12. In the electrochemical machining process, the power supply 16 is one that supplies a direct current to the gap. The machining fluid is an electrolyte, which provides a conductive path across the gap such that stock is electrochemically removed from the workpiece 12 by continuous discharges. Those versed in the art will readily understand the modifications in the apparatus required to carry out either process.

For demonstration purposes, the FIGURE 1 apparatus will be described in conjunction with the electrical discharge machining process.

Considering now the details of the FIGURE 1 apparatus, the source 14 includes as a part thereof a tank 20 in which contaminated dielectric fluid is maintained at a certain level. This contaminated dielectric fluid in the tank 20 flows via an outlet 22 through a filter 24 to a sump 26. From the sump 26 a suitable positive pressure type pump 28 supplies the now filtered fluid to the machining gap at a relatively constant pressure determined by a pressure regulator 30 of any conventional construction.

The power supply 16, as mentioned, is connected across the gap and is of the pulsating kind, such as an oscillator or a motor-generator set, suited to provide power to the gap at a relatively high frequency. Without limitation this power may be supplied at 50 or 60 kc.

In the embodiment of the invention illustrated in FIGURE 1, the maneuvering arrangement 18 moves the cutting tool 10 either in a gap closing direction or a gap opening direction relative to the workpiece 12. Obviously, if needed, the workpiece 12 could be moved in a similar way or both the cutting tool 10 and the workpiece 12 moved. A further part of the arrangement 18 is a feed motor 32 that is connected to a cutting tool holder 34 through a universal joint connection 36. The cutting tool holder 34 and the cutting tool 10 are electrically insulated from each other by a spacer 38 of any known insulating material. The workpiece 12 is positioned directly opposite the cutting tool 10 and is suitably connected to an enclosure member 40, which is insulated from a workpiece support 42 by an insulating spacer 44. The workpiece support 42 is fixedly joined to the tank 20.

The enclosure 40 affords a chamber below the workpiece 12 for clean dielectric fluid, which is supplied thereto via an inlet 46 from the pump 28. Hence, clean dielectric fluid flows upwardly through the gap and out into the tank 20 insuring that the exposed surfaces between the cutting tool 10 and the workpiece 12 within the gap area are always exposed to clean dielectric fluid. This avoids any secondary erosion that, in itself, would not only influence the machining rate but also affect the surface finish on the workpiece 12.

The universal joint connection 36 includes an upper fork 47 operatively joined to the feed motor 32 in any appropriate way and a lower fork 48 that is secured to the cutting tool holder 34. The universal joint between the upper fork 46 and the lower fork 48 is made by a spider 50, as shown in FIGURE 2. The spider 50 has two opposite legs 52 and 54 journaled to the upper fork 47 and two other opposite legs 56 and 58 journaled to the lower fork 48. This universal joint connection 36 serves to eliminate any misalignment, looseness or other typical dimensional induced differences that would influence the relationship of the cutting tool 10 to the workpiece 12. Moreover, the universal joint connection 36 compensates for nonparallelism if any exists between the feed motor 32 and the upper fork 47. Also, side thrust is compensated by the permitted lateral movement by the universal joint connection 36.

Further facilitating stability are a series of guide motors designated generally at 60. These guide motors 60 in the FIGURE 1 apparatus are four in number, and are arranged as illustrated in FIGURE 2. Because each of the guide motors 60 is identical only one will be described, and that is shown in section in FIGURE 1. As illustrated, the guide motor 60 includes a piston 62 press fitted or otherwise fixed to the workpiece support 42, and the piston cylinder 64 similarly press fitted within or otherwise joined to a bore 66 in the cutting tool holder 34. A roller bearing 68 is interposed between the piston 62 and the cylinder 64 so as to afford relatively frictionless sliding connection therebetween. An external sleeve 70 is sealingly attached to the workpiece support 42, and through suitable seals arranged at 72 and 74 maintains a sealing engagement with the periphery of the piston cylinder 64. The top of the bore 66 is enclosed by sealing cap 76 that communicates with a pressure source 78. In this apparatus the pressure medium is air and the pressure at which the air acts between the piston 62 and the piston cylinder 64 is maintained relatively constant by a conventional pressure regulator 80. This air pressure, therefore, within each of the guide motors 60 urges the cutting tool 10 upwardly with a cumulative constant force that is opposed by that produced by the feed motor 32.

The feed motor 32 may be operated in any known way, such as by fluid pressure and by the control from a force motor 82, in turn operated by a control system 84. Both the force motor 82 and the control system 84 may be of the character disclosed in the patent to Colten et al. 3,059,150. Briefly, the control system 84 senses the voltage across the gap and compares it with a reference voltage from a reference voltage source 86. Any differential will result in an error signal voltage that energizes the force motor 82 in such a way that the feed motor 32 will, through the universal joint connection 36, either move the cutting tool 10 inwardly or outwardly so as to maintain some desired gap that corresponds to the reference voltage.

Operationally, the reference voltage source 86 is adjusted to provide an output reference voltage corresponding to the gap wanted between the cutting tool 10 and the workpiece 12. This, of course, is subject to many variables including the kind of dielectric fluid and the cutting tool and workpiece materials. The power supply 16 is turned on and the supply pump 28 rendered effective. Assuming that the cutting tool 10 is in the proximity of the workpiece 12, the control system 84 will be immediately effective to establish the proper gap spacing and pulsating discharges will commence to take place across this gap while clean dielectric fluid is flowing therethrough. The universal joint connection 36 serves the functions mentioned previously in counteracting the numerous potential misalignments either due to dimensional differences or external forces that produce, e.g. side thrust. Meanwhile the feed motor 32 will be producing a feeding force that urges the cutting tool 10 in the gap space reducing direction as stock is removed from the workpiece 12. This feeding force will be opposed by the cumulative force from the guide motors 60. Hence, stability is encouraged. For instance, fluctuations in the pressure of the dielectric fluid tending to urge the cutting tool 10 upwardly can, by the selection of proper air pressures, be so negligible as to be no factor. Otherwise, these variables would upset the equilibrium needed to obtain precise and accurate feeding of the cutting tool 10 by the feed motor 32. Dielectric fluid pressure variations would actually produce a hunting and thus reduce the machining rate.

Another significant contribution of the guide motors 60 results when a short occurs across the gap and the gap voltage reduces when this happens, the feed motor 32 is advised by a correspondingly increased error signal voltage that the cutting tool 10 and the workpiece 12 should be separated. The feeding force from the feed motor 32 is therefore reduced prior to the motor 32 reversing and generating a cutting tool withdrawing force. But with the aid of the guide motors 60 since their cumulative constant force, as explained, urges the cutting tool 10 upwardly as soon as the feed force no longer dominates, this all takes place rapidly. Hence, there is not the usual wait for the force motor 82 to cause the feed force to null and then the retract force to build up to a value adequate to retract the cutting tool 10. Therefore, there is no concern for backlash due to the lack of close mechanical fits between the intervening mechanical structure or inherent hysteresis in the feed motor 32 since these do not interfere with the instantaneous initial retraction provided by the guide motors 60 until the feed motor 32 takes over. With this assured rapid response the short circuit can be quickly removed and the cutting tool 10 returned to its proper position. As can be appreciated, when only minor adjustments must be made, this opposing force from the guide motors 60 is always effective and always available to eliminate the backlash inherent in any mechanical device.

From the foregoing, it will be appreciated that much of the instability in the feed mechanisms for electrical stock removal apparatus has been removed by the use of the universal joint connection 36 and the guide motors 60. The removal of the resultant instabilities in the apparatus has permitted, particularly in the case of electrical discharge machining, the desired goal of having the frequency of the gap discharges more closely approximate the input frequency of the voltage from the power supply to be actually achieved. Further benefits result because there is less need for close dimensional controls on the apparatus thus permitting the feed mechanisms to be simplified as well as the various fixtures involved.

The invention is to be limited only by the following claims.

What is claimed is:

1. In electrical stock removal apparatus, the combination of conductive cutting tool and workpiece electrodes spaced apart so as to form a machining gap therebetween, a source of electrical power connected across the gap so as to effect electrical stock removing discharges thereacross, and means maneuvering the electrodes relative to each other, the maneuvering means including feed means operative to provide a feed force or a retract force for moving the electrodes respectively in gap closing or in gap opening directions relative to each other and pressure fluid operated means so arranged as to provide an aligning guide for stabilizing the relative movements of the electrodes by the feed means and also to exert a constant force for opposing relative movement between the electrodes in the gap closing direction thereby opposing the feed force to produce instantaneous movement of the cutting tool electrode in a gap opening direction when the constant force exceeds the feed force and thereafter supplementing the retract force.

2. In electrical stock removal apparatus, the combination of conductive cutting tool and workpiece electrodes spaced apart so as to form a machining gap therebetween, a source of machining fluid, a source of electrical power connected across the gap so as to effect electrical stock removing discharges thereacross, and means maneuvering the electrodes relative to each other, the maneuvering means including motor means operative to provide a feed force or a retract force for moving the electrodes respectively in a gap closing direction or in a gap opening direction, universal connecting means for providing plural plane movement between the motor means and one of the electrodes, and pressure fluid operated means so arranged as to provide an aligning guide for stabilizing the movement by the motor means of the one electrode relative to the other electrode and also to exert a constant force for opposing movement of the one electrode in the gap closing direction thereby opposing the feed force to produce instantaneous movement of the cutting tool electrode in a gap opening direction when the constant force exceeds the feed force and thereafter supplementing the retract force.

3. In electrical stock removal apparatus; the combination of conductive cutting tool and workpiece electrodes spaced apart so as to form a machining gap therebetween; a source of electrical power connected across the gap so as to effect electrical stock removing discharges thereacross; means maneuvering the electrodes relative to each other; the maneuvering means including means operative to provide a feed force or a retract force for moving the electrodes respectively in a gap closing direction or in a gap opening direction, means providing a universal connection for providing plural plane movement between the motor means and one of the electrodes, and pressure fluid operated means so arranged as to provide an aligning guide for stabilizing the relative movements of the electrodes and also to exert a constant force for opposing movement of the one electrode in the gap closing direction thereby opposing the feed force to produce instantaneous movement of the cutting tool electrode in a gap opening direction when the constant force exceeds the feed force and thereafter supplementing the retract force.

4. In electrical stock removal apparatus; the combination of conductive cutting tool and workpiece electrodes spaced apart so as to form a machining gap therebetween; a source of electrical power connected across the gap so as to effect electrical stock removing discharge thereacross; and means maneuvering the electrodes relative to each other; the maneuvering means including a feed motor operative to provide a feed force or a retract force for moving one of the electrodes respectively in a gap closing direction or in a gap opening direction relative to the other of the electrodes, a guide motor including a piston cylinder and a piston slidable within the piston cylinder, the piston and the piston cylinder being operatively connected each to different ones of the electrodes to provide an aligning guide for the relative movement therebetween, and a source of relatively constant fluid pressure communicating with the guide motor so as to cause a constant force to be developed thereby for urging the electrodes in the gap opening direction thereby opposing the feed force to produce instantaneous movement of the cutting tool electrode in a gap opening direction when the constant force exceeds the feed force and thereafter supplementing the retract force.

5. In electrical stock removal apparatus; the combination of conductive cutting tool and workpiece electrodes spaced apart so as to form a machining gap therebetween; a source of electrical power connected across the gap so as to effect electrical stock removing discharges thereacross; and means maneuvering the electrodes relative to each other; the maneuvering means including a feed motor operative to provide a feed force or a retract force to move one of the electrodes respectively in a gap closing direction or in a gap opening direction relative to the other electrode, means providing a universal connection providing plural plane movement between the feed motor and the one electrode, a guide motor including a piston slidably positioned within a piston cylinder, the piston and the piston cylinder each being operatively connected to different ones of the electrodes to provide an aligning guide for the relative movement therebetween, and a source of relatively constant fluid pressure communicating with the guide motor so as to cause the guide motor to exert a constant force for urging the electrodes in the gap opening direction thereby opposing the feed force to produce instantaneous movement of the cutting tool electrode in a gap opening direction when the constant force exceeds the feed force and thereafter supplementing the retract force.

6. In electrical stock removal apparatus; the combination of conductive cutting tool and workpiece electrodes spaced apart so as to form a machining gap therebetween; a source of machining fluid; a source of electrical power connected across the gap so as to effect electrical stock removing discharges thereacross; and means maneuvering the electrodes relative to each other; the maneuvering means including a feed motor operatively connected to one of the electrodes to provide a feed force or a retract force for moving the one electrode respectively in a gap closing direcfon or in a gap opening direction relative to the other electrode, control means for the feed motor and operative to cause the feed motor to maintain a predetermined gap between the electrodes, a universal connection providing plural plane movement between the feed motor and the one electrode, a series of guide motors each including a piston cylinder and a piston slidably housed within the piston cylinder, all of the pistons and all of the piston cylinders being operatively connected as groups to different ones of the electrodes to provide aligning guides for the relative movement therebetween, and a source of relatively constant fluid pressure communicating with each of the guide motors so as to cause the guide motors to exert a constant force for urging the electrodes in the gap opening direction thereby opposing the feed force to produce instantaneous movement of the cutting tool electrode in a gap opening direction when the constant force exceeds the feed force and thereafter supplementing the retract force.

7. In electrical stock removal apparatus; the combination of conductive cutting tool and workpiece electrodes spaced apart so as to form a machining gap therebetween; a source of machining fluid; a source of electrical power connected across the gap so as to effect electrical stock removing discharges thereacross; and means maneuvering the electrodes relative to each other; the maneuvering means including a feed motor operative to provide a feed force or a retract force to move the cutting tool electrode respectively in a gap closing direction or in a gap opening direction relative to the workpiece electrode, a universal connection providing plural plane movement between the feed motor and the cutting tool electrode, a series of guide motors for providing aligning guides for the relative movement between the electrodes, each motor including a piston operatively connected to the workpiece electrode, and a piston cylinder for slidably housing the piston and operatively connected to the cutting tool electrode, and a source of relatively constant fluid pressure communicating with each of the guide motors so as to cause a constant force to be exerted by the guide motors for urging the cutting tool electrode in the gap opening direction thereby opposing the feed force to produce instantaneous movement of the cutting tool electrode in a gap opening direction when the constant force exceeds the feed force and thereafter supplementing the retract force, and a control system for the feed motor, the control system being effective to control the feed motor in response to a gap condition.

8. In electrical discharge machining apparatus; the combination of conductive cutting tool and workpiece electrodes spaced apart so as to form a machining gap therebetween; a source of dielectric fluid; a source of electrical power connected across the gap so as to effect electrical stock removing discharges thereacross, and means maneuvering the electrodes relative to each other, the maneuvering means including a feed motor, a holder for the cutting tool electrode, a universal connection providing plural plane movement between the feed motor and the cutting tool electrode holder, the feed motor being operative to provide a feed force or a retract force to move the cutting tool electrode respectively in a gap closing direction or in a gap opening direction relative to the workpiece electrode, a support for the workpiece electrode, four guide motors for providing aligning guides for the relative movements between the electrodes, each motor including a piston opratively connected to the workpiece electrode at predetermined spaced distances and a piston cylinder slidably housing the piston and operatively connected to the cutting tool electrode holder, a source of relatively constant air pressure communicating with each of the guide motors so as to cause a constant force to be exerted by the guide motors for urging the cutting tool electrode in the gap opening direction thereby opposing the feed force to produce instantaneous movement of the cutting tool electrode in a gap opening direction when the constant force exceeds the feed force and thereafter supplementing the retract force, and a control system for the feed motor, the control system being operative in response to gap voltage to cause the feed motor to urge the cutting tool electrode in a gap closing direction or in a gap opening direction so as to maintain a predetermined gap voltage between the electrodes.

References Cited

UNITED STATES PATENTS

| | | | |
|---|---|---|---|
| 324,311 | 8/1885 | Fiske | 314—61 |
| 2,422,362 | 6/1947 | Moore | 314—61 |
| 2,596,708 | 5/1952 | Moore | 314—61 |
| 2,958,000 | 10/1960 | Barnes | 314—69 |
| 2,981,822 | 4/1961 | Larkins | 219—69 |
| 2,989,616 | 6/1961 | Mironoff | 219—69 |

RICHARD M. WOOD, *Primary Examiner.*

R. F. STAUBLY, *Assistant Examiner.*